(No Model.)
A. KÜCHENMEISTER, A. GRÖSCHEL & A. RAUCHENBICHLER.
FIRE KINDLER.
No. 288,067. Patented Nov. 6, 1883.
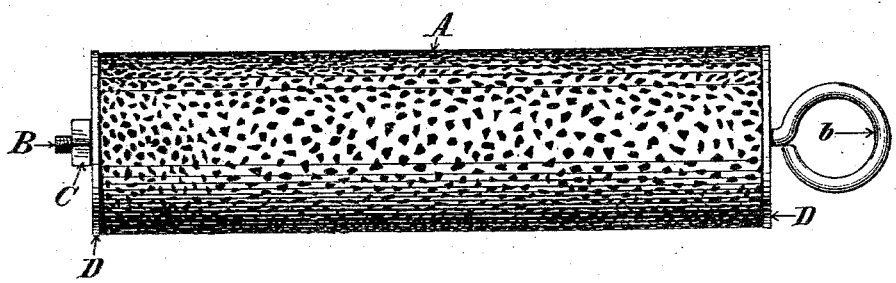
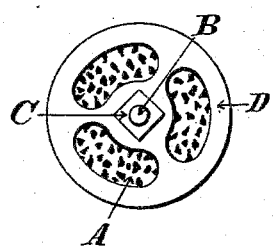
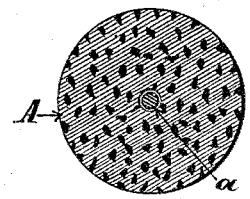
Attest
Carl Spengel
Wm S. Sayers
Inventor's
August Küchenmeister
Anton Gröschel
Alois Rauchenbichler
by Knight Bros. Atty's

UNITED STATES PATENT OFFICE.

AUGUST KÜCHENMEISTER, ANTON GRÖSCHEL, AND ALOIS RAUCHENBICHLER, OF CINCINNATI, OHIO.

FIRE-KINDLER.

SPECIFICATION forming part of Letters Patent No. 288,067, dated November 6, 1883.

Application filed March 19, 1883. (No model.)

*To all whom it may concern:*

Be it known that we, AUGUST KÜCHENMEISTER, ANTON GRÖSCHEL, and ALOIS RAUCHENBICHLER, all of Cincinnati, Hamilton county, Ohio, have invented a new and useful Fire-Kindler, of which the following is a specification.

Our invention consists in the fire-kindler hereinafter described, and pointed out in the claim.

Our invention consists partly in the composition of our porous block and partly in the device for incasing the same, and providing a means for handling it without soiling the fingers.

Figure 1 is a side, and Fig. 2 an end, view of a fire-kindler embodying our invention. Fig. 3 is a cross-section of the same.

A represents a block, preferably cylindrical, as shown, and having an axial perforation, $a$. This block is composed of some porous and highly-refractory substance, such as porous fire-brick. We prefer to compose the block as follows: fire-clay, fifteen parts; charcoal-dust, of about the coarseness of coarse cornmeal, ten parts; clear sand, (free of lime,) five parts; stoneware-clay, one part. The above composition is tempered as in a common brick-mill, and having been formed into blocks by molds, said blocks are baked in an oven, such as commonly employed for stoneware.

While preferring the ingredients and proportions thereof mentioned, we do not confine ourselves absolutely thereto. For example, instead of charcoal-dust, we may employ any material (such as sawdust, for example) that by burning away in the act of baking will leave an intractable mass sufficiently porous to absorb the inflammable liquid.

The block thus prepared receives a rod, B, screw-threaded at one end for a nut, C, and at its other end bent into an eye or loop, $b$. This rod and nut hold to the ends of the block two iron caps, D.

When not in use in the grate, the kindler is kept in a can or pot which contains crude petroleum or other cheap and highly inflammable liquid or semi-liquid, and when wanted for use is lifted from such can by inserting a hook in the loop $b$.

We claim as new and of our invention—

A fire-kindling device consisting of a perforated cylindrical block of fire-clay, coarse charcoal-dust, clear sand, and stoneware-clay, tempered and baked, rod B, having loop $b$, nut C, and circular perforated caps D, as set forth.

In testimony of which invention we hereunto set our hands.

AUGUST KÜCHENMEISTER.
ANTON GRÖSCHEL.
ALOIS RAUCHENBICHLER.

Attest:
CARL SPENGEL,
JOHN A. PENN.